United States Patent
Michell et al.

(10) Patent No.: US 6,199,683 B1
(45) Date of Patent: Mar. 13, 2001

(54) HIGH SPEED REVOLVING BOARD SINGULATOR WITH RETRACTING SHOE AND VARIABLE DWELL DUCKERS

(75) Inventors: Steven W. Michell; Emeric Johnson; William R. Newnes; Robert B. van Varseveld, all of Salmon Arm (CA)

(73) Assignee: CAE Electronics Ltd., St. Laurent (CA)

( * ) Notice: Subject to any disclaimer, the term of this patent is extended or adjusted under 35 U.S.C. 154(b) by 0 days.

(21) Appl. No.: 09/305,652

(22) Filed: May 5, 1999

Related U.S. Application Data

(63) Continuation-in-part of application No. 08/710,437, filed on Sep. 17, 1996, now abandoned.

(30) Foreign Application Priority Data

Sep. 16, 1996 (CA) .................................................. 2 185 620

(51) Int. Cl.⁷ .................................................. B65G 29/00
(52) U.S. Cl. .................................................. 198/476.1; 198/463.5; 198/459.5
(58) Field of Search ........................... 198/463.5, 459.5, 198/476.1

(56) References Cited

U.S. PATENT DOCUMENTS

| | | | |
|---|---|---|---|
| 4,077,524 | * 3/1978 | Rysti | 214/8.5 |
| 4,869,360 | * 9/1989 | Brown et al. | 198/460 |
| 5,419,425 | * 5/1995 | Goater | 198/461.3 |
| 5,813,512 | * 9/1998 | Andersson et al. | 198/463.5 |

* cited by examiner

Primary Examiner—Christopher P. Ellis
Assistant Examiner—Joe Dillon, Jr.
(74) Attorney, Agent, or Firm—Antony C. Edwards

(57) ABSTRACT

A lug loader includes a first shaft rotatably mounted transversely across a board flow path, wherein a board in the board flow path is aligned transversely across the board flow path. The board translates in a downstream direction on a board infeed transfer from an upstream position. A board supporting structure such as a disc is rigidly mounted to the first shaft so as to rotate with rotation of the first shaft. The board supporting structure has a shoe mounting surface extending generally orthogonally from the first shaft. The board supporting structure also has a radially outer-most rim, radially outer-most relative to the first shaft. The rim is generally circular and generally circumferentially contiguous so as to form a board supporting surface around the rim. An elongate shoe has first and second ends. A board supporting heel is mounted on the shoe. The shoe is pivotally mounted at the first end of the shoe to the shoe mounting surface. A cam follower is mounted to the shoe at generally the second end of the shoe so as to protrude from the shoe away from the shoe mounting surface.

22 Claims, 14 Drawing Sheets

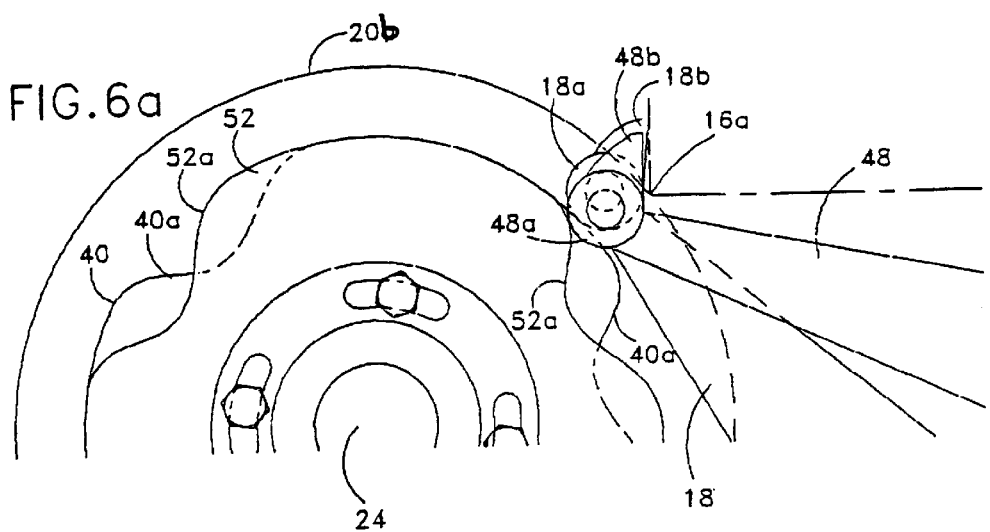
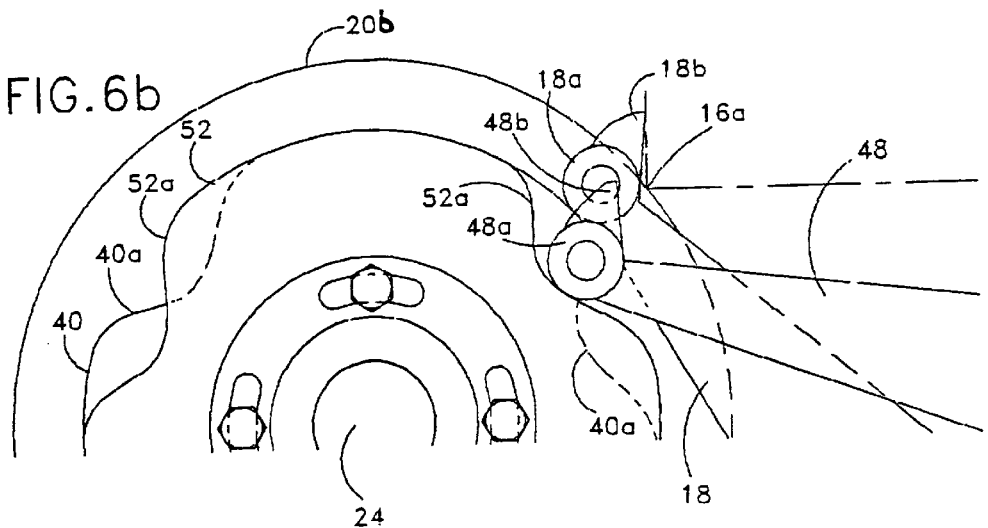

HIGH SPEED REVOLVING BOARD SINGULATOR WITH RETRACTING SHOE AND VARIABLE DWELL DUCKERS

CROSS REFERENCE TO RELATED APPLICATION

This application is a Continuation-In-Part from U.S. patent application No. 08/710,437 filed Sep. 17, 1996, now abandoned, titled High Speed Revolving Lug Loader With Retracting Heel And Hook.

FIELD OF THE INVENTION

This invention relates to an apparatus for the singulation or allocation of lumber into lug spaces on a lugged transfer, or other lumber conveying device, and in particular relates to an apparatus capable of collecting, singulating, allocating and consistently spacing, rough sawn lumber or planed finished lumber, or sticks of varying widths, thickness and lengths into consecutive spaced-apart lugs, or allocated spacings onto a transfer, or lugged transfer, or to a stick placing device, at high speeds.

BACKGROUND OF THE INVENTION

Conventional lug loaders or singulators (hereinafter collectively referred to as either lug loaders or singulators) have been found to be inadequate at higher feed speeds. They are also limited in their ability to both singulate and allocate lumber. When lumber is of varying widths and varying in thickness, or bowed, as may be predominant in curve sawing mills, cupped or crooked, it becomes increasingly difficult to handle the lumber at desirable higher speeds.

An example of a conventional lug loader is that taught in U.S. Pat. No. 3,923,142 which issued to Rysti on Dec. 2, 1975. In that patent the means for stopping work pieces prior to being singulated is only briefly mentioned. In particular, what is being taught is singulating boards by use of supporting arms rotating around a closed loop, the orientation of the supporting arms controlled by curved deflectors. Pressing arms in opposed radial pairs, are rotatably mounted above the supporting arms to synchronously clamp a board onto a supporting arm. Downstream flow of the mat of boards is arrested by a stop on each supporting arm. None of the advantages of the synchronized duckers of the present invention are taught or suggested. Rysti also does not disclose a mechanism for allocating or missing a lug space, especially at high speeds. The need to miss lug spaces arises for example where it is desirable to "cut-in-two" a long piece of lumber to meet mill requisites. In a "cut-in-two" situation there is a need to create an empty lug space behind the board. To achieve a "cut-in-two", a drop saw including a device to lift and set the cut length into the following lug space is provided up-stream on the lugged transfer.

At high speed, deliberately and accurately missing a lug space, which it is an object of the present invention to provide, requires a fast acting method to momentarily deactivate all feed and clamping devices, and subsequently to reactivate those apparatus in the brief time available as the closely spaced lugs are rotated past the singulator.

It is also an object of the present invention to provide for specific board allocating patterns required in the delivering of spacing sticks to a stick placer and its associated stacker to allow placing of sticks on lumber packages possibly having different package lengths.

Applicants are also aware of U.S. Pat. No. 5,518,106, which issued to Allard on May 21, 1996. Allard discloses using fixed pick-up shoes mounted onto rotating discs for engaging and supporting boards being singulated. Fixed shoes however, have the disadvantage that they may mark the underside of the board as the board is translated over the top of the disc and as the board is released. If a board is planned or finished, for example destined for cabinet making or the like, then any marks from the shoe or overhead clamp will reduce the value of the board. Allard also discloses a speed-up belt to pull the board away from the fixed shoes at the top of the disc to prevent the board from being flipped over as the board is released from the shoes. In some mills the boards have been marked for trimming and grading before the lug loader. Thus if the board has been flipped over by the singulator, as may occur in the case of the Allard device, the board must be flipped back by hand to read the mark. This can be difficult in a high speed application.

Many lug loaders in the prior art, particularly those operating at slower feed speeds, require that, in order to stop the delivery of boards to the singulator, the board mat moving downstream into the singulator device must be pushed back upstream by the stopping means, that is, forced away from the fixed pick-up shoe and clamping device. Worse yet, in some prior art devices the board delivery mechanism must be brought to a complete stop. Both pushing the mat of boards back upstream, and stopping the board delivery mechanism, can be impractical at high speed, a problem which is not adequately dealt with in the prior art.

It is therefore an object of the present invention to produce an apparatus wherein the delivery of boards is more controlled, with a simple means for stopping, activating and deactivating both a clamping means and a rotating pickup shoe simultaneously, allowing more precise and faster pick-up and delivery of spaced and allocated boards.

It is further an object of the present invention to produce an apparatus that has a quick acting stopping device for stopping the flow downstream of a board mat adjacent the singulator, wherein the stopping device has an adjustable dwell.

It is yet another object of the present invention to produce an apparatus that reduces the likelihood of leaving marks on the board by the pick-up and clamping device.

It is still another object of the present invention to produce an overhead clamping apparatus that can be retrofitted to existing lug loaders of the general type to improve the speed and consistency of delivery of boards by said existing lug loaders.

SUMMARY OF THE INVENTION

The high speed revolving lug loader of the present invention consists of a board infeed transfer, whereat the boards collect at a plurality of hook stops, so as to abut each other to form a mat of boards. The downstream-most boards in the mat are released by the hook stops and picked up by a plurality of shoes. The shoes are carried in a semi-circular arc on rotating discs. The boards are clamped down onto the shoes by an overhead clamping means. The plurality of shoes are pivotally mounted on the rotating discs. The overhead clamping means are timed to coincide with the timing of the rotation of the shoes on the rotating discs so that a clamp is applied to a board being carried on a shoe. The clamp and shoe interact to pickup and clamp boards so as to deliver the boards individually and sequentially to a lugged transfer, or to allocate boards or sticks to a delivery transfer for a stick placer of the general type.

Each shoe is elongate. One end of each shoe is pivotally mounted to its corresponding rotating disc. The opposite end of each shoe supports a cam follower. The cam follower protrudes from the shoe so as to ride on the cam surface of a cam. The cam is selectively rotatably mounted on a hub shaft, collar or sleeve that may have a common axis of rotation with the axis of rotation of the rotating disc. The cam is selectively rotatable, independently of rotation of the rotating disc. The cam is asymmetric about its axis of rotation so as to provide a cam lobe for actuation of the shoe into engagement with the underside of a board to be singulated when the cam is rotated to elevate the lobe from a non-actuating position to a shoe actuating position.

With the cam in the shoe actuating position, as a shoe is rotated on the rotating disc, the cam follower rides on the cam surface up over the cam lobe thereby forcing the board pickup surface, or, otherwise, the board engaging and supporting surface on the shoe against the underside of the board, urging the board upwardly so as to be carried in a transition arc along an arcuate path defined by the arcuate translation path of the shoe and the arcuate, upwardly exposed, radially outermost edge of the rotating disc. The cam surface smoothly merges from the cam lobe to a radially retracted position relative to the radial extension of the cam lobe, so that in its actuated position the board transitions from being carried by the shoe, to being supported by the radially outermost edge of the rotating disc as the shoe retracts radially inwardly of the radially outermost edge of the rotating disc as the board is carried in the translation arc along the arcuate path.

Thus, as the cam followers, follow a cam profile which cause the shoes to come around in to a level orientation to pickup the board, the shoe pickup surface will be level when the board is engaged by the shoe. The duckers are timed to retract as the shoes lift the board. As the cams followers follow the profile of the cam, the shoe pickup surface gradually tilts or inclines to follow an optimum trajectory between the board's pickup position and the board's subsequent position. The overhead clamping means contacts the board as the board is carried over the rotating discs, that is, follows the arcuate path. The cam profile is shaped so that the shoe orientation changes to approximately coincide with the different tangent angles of the average trajectory that the different width and thickness of boards will follow as the boards are picked up and delivered to the outfeed transfer.

In one embodiment, the cam may be rotatably mounted, for example but without intending to be limiting, by means of a bearing hub, to the same shaft that supports the rotating discs. It is understood that such a cam, and other actuating cams in the present invention, although depicted as being mounted on a common axle with other structural elements of the present invention, are free floating on such axles and because they are not tied to the rotation of such axles may also be independently mounted on other supporting structure. In any event, the cam is held in a steady position, that is, it is not rotated, until it is desired to stop feeding the boards. A linkage is connected to a cam cylinder. The cam cylinder (or other selectively actuable device) actuates to rotate the cam lobe, for example so as to rotate the cam lobe down so that the shoes are retracted behind or beneath the duckers and not exposed. Thus retracted, the shoes miss the board being held by the ducker. At the same time that the cam is rotated down, a linkage holds the ducker or duckers up so that they do not release the board, but rather, stop the flow of boards from the board mat on the infeed chains.

The duckers are operated mechanically by a ducker cam, which is adjustably mounted to the same common shaft as the rotating discs. The ducker or duckers can also be controlled by other means such as a directly connected actuable cylinder or other linkage system. No matter how the ducker is actuated it must be held in its up or elevated position when the cam lobe is rotated down, or the infeed would continue to push boards into and onto the continuously rotating discs.

A sensor may be positioned to detect the position of the shoes, so that the rotation of the cam (deactivation of pickup shoes) will not be done while the shoes are about to pick up, or are just picking up a board. The sensor advantageously includes the ability to stop the actuation of the cam cylinder for a period in time corresponding to the time period the shoes are in the board pickup area, that is, actuation of the cam cylinder to rotate the cam would be paused for the appropriate time to suit the different speeds that the machine may be set to. Another way to accomplish this would be to have two sensors, one to detect the shoe as it enters the pickup area and another to detect the shoe as it leaves the pickup area.

Where sawmills require that the widths of boards being separated vary widely, that is, from very narrow boards such as 2 inches by 2 inches, to boards 10 inches and wider, a dual ducker system can be used. In this situation there are two separate ducker systems, where both systems include separate ducker cams independently actuating separate first and second duckers laterally spaced apart across the board flow path. The first and second duckers stop the boards at a common position along the flow path. The second duckers, are lowered leaving the first duckers to restrain downstream movement of the boards onto the singulator. The downstream-most board is released in a timed manner to register the released board with the next shoe rotating around on the rotating discs into cooperating position. As the board is released by the first duckers, the second duckers are raised quickly by a second ducker actuator, thereby preventing the next upstream board from being inadvertently released prior to the rotation of the next shoe into position.

The reason for this dual ducker system is that when using the cam operated ducker system, the cam profile that lowers and raises the duckers cannot be too radical without requiring heavier springs etc. and consequently extra costs and wear points. The secondary ducker system allows the use of the same basic cam profile as that operating the first duckers, only operating a little earlier, that is, with its timing advanced over the primary or first duckers, so as to achieve rapid, controlled, singulated, board release by the duckers. The duckers themselves are improvements over the use of, for example, pins which must be fully lowered before a board is released. The duckers are rotated down and slightly downstream as they are lowered allowing the board to be released to commence movement prior to the ducker being fully lowered.

In an alternative embodiment, the shoes are not pivotally mounted on rotating discs, but rather on a pair (or plurality) of endless circulating chains. This arrangement also allows the shoes to continue to carry the boards into the lugged transfer for more controlled delivery of the boards. The shoes are timed so that the boards are delivered to the back of the passing lugs so that the next pair, or group of lugs are rotated on the transfer chain to come up and around the transfer chain sprockets to meet the trailing edge of the board so as to carry the board in the lug space. This provides more control for delivering wider boards, that is, boards 12 inches and more wide, because the boards do not ride over an arcuate path over the radius of the top of the rotating discs, but are carried substantially flat on the chain, gripped between the shoes and any overhead clamping device. The boards are carried by the endless circulating chains, right up to and into the lug spaces on the transfer chains.

In the preferred embodiment, the overhead clamping means for gripping the boards onto the shoes, as the shoes are in motion, includes a array radially spaced of flexible elongate members mounted on a rotatable overhead shaft. The overhead shaft is mounted over the duckers so as to engage the radially outermost ends of the flexible elongate members down onto the leading edge of the board held by the duckers as the board is lifted by the shoes. The flexible elongate members contact the board so as to hold the board onto the shoes as the board is carried along the arcuate path on the rotating discs. In one embodiment, the flexible elongate members are resilient finger-like shafts which resiliently flex as the board is raised and comes up to the top of the arcuate path defined by the rotating discs. The array of flexible elongate members rotating on the overhead shaft at a rotational speed so that the ends of the flexible elongate members translate in the same direction and at the same speed as the board and corresponding shoes. At a position just past the top and center of the disc, the flexible elongate members may engage a fixed roller. The fixed rollers, or other rigid means of further flexing the flexible elongate member, flexes the elongate member to disengage the end of the elongate member from the board. The fixed rollers may be mounted above the rotating discs, downstream of the overhead shaft on which the array of elongate members is mounted. In the absence of fixed rollers or the like, the flexible elongate members may cause the board to flip over as the flexible members are rotated on the overhead shaft so as to translate the ends of the elongate members across the top of the rotating discs. The fixed rollers inhibit boards having a square cross-section, such as a 4 inch by 4 inch board or the like from being rolled over, and also inhibit smaller boards from being flicked ahead prematurely as the flexible elongate members begin to unflex or extend as the boards translate on their arcuate path away from the elongate member.

An alternative overhead clamping means is a rotating shaft having a pin or crank boss. A plunger rod is attached. The position of the overhead crank is such that, when the plunger rod is rotated down, a fixed stop guides the plunger rod so that the plunger rod is angled. The plunger rod thereby contacts the top of the leading edge of a board as the board was being picked up by the shoes. The plunger rod presses the board down onto the shoes as the shoes rotate around on the discs. The plunger rod may have a resilient length compression means such as a telescoping or resilient coupling or joint to allow the plunger rod to compress to accommodate even very thick boards. Thus as the board translates in the arcuate path over the rotating discs, the plunger rod holds a relatively and approximately constant pressure onto the board. As the board passes the apex of the arcuate path, that is, the top of the rotating discs, the momentum of the board carries the board onto the out feed transfer. The plunger rod is then rotated up, so as to lose contact with the board. The plunger rod then swings on the crank pin so as to fall back onto the fixed stop, where the plunger rod is again angled to come down onto the next board. Depending on the operation speed of the singulator, the plunger rod may have a direct linkage means to return the plunger rod in a timed sequence to the fixed stop.

In a further alternative embodiment, the overhead clamping means may be a circulating resilient belt.

In summary, the lug loader of the present invention includes a first shaft rotatably mounted transversely across a board flow path, wherein a board in the board flow path is aligned transversely across the board flow path. The board translates in a downstream direction on a board infeed transfer from an upstream position. A board supporting structure such as a disc or chain is mounted to the first shaft so as to rotate with rotation of the first shaft. The board supporting structure has a shoe mounting surface generally orthogonal to the first shaft. The board supporting structure also has a radially outer-most rim, radially outer-most relative to the first shaft. The rim is generally circumferentially contiguous so as to form a board supporting surface around the rim. An elongate shoe has first and second ends. A board supporting heel is mounted on the shoe. The shoe is pivotally mounted at the first end of the shoe to the shoe mounting surface. A cam follower is mounted to the shoe so as to protrude from the shoe away from the shoe mounting surface.

A cam is independently selectively rotatably mounted on the first shaft or on other supporting structure that allows actuation of the cam, collectively and without intending to be limiting referred to as a cam support. The cam cooperates with the cam follower. The cam has a cam surface lying generally in a first plane, the first plane adjacent to and generally parallel with the shoe mounting surface. The cam surface is a radial cam distance from the cam support. The rim is a radial rim distance from the cam support. The radial cam distance is less than the radial rim distance. The cam surface defines a first cam lobe which is asymmetric and radially extends about the cam support relative to a non-extended circumference of the cam surface. The first cam lobe is generally on an upstream side of the cam. The non-extended circumference of the cam is generally on a downstream side of the cam. The cam lobe is selectively rotatable, by selective rotation of the cam by a cam actuator, between an upwardly rotated shoe actuating position and a downwardly rotated shoe non-actuating position. The cam follower lies generally in the first plane and co-operates with the cam surface so as to ride over, in surface-following contact with, the cam surface on the upstream and downstream sides of the cam, as the board supporting structure rotates about the cam support relative to the cam. The cam lobe when in the shoe actuating position drives the board supporting surface on the shoe radially outwardly of the rim as the cam follower rides over the cam surface corresponding to the cam lobe.

The lug loader of the present invention further includes a selectively actuable board retainer and sequencer at a board holding location in the board flow path, adjacently upstream of the board supporting structure. The board when retained in the board retainer is held in the holding location for sequenced release onto the board supporting surface of the shoe as the shoe is rotated over the cam lobe when the cam lobe is in the shoe actuating position. The board is thereby translated along a transfer path over the board supporting structure onto a board outfeed transfer so as to singulate the board from an upstream mat of boards upstream of the board retainer.

The lug loader of the present invention may further include a rotatable resilient board clamp. The clamp is rotatably mounted over the board supporting structure and cooperates with the shoe so as to pinch the board between the resilient clamp and the board supporting surface on the shoe as the board is translated along the transfer path. In one embodiment, the resilient clamp may be a resilient elongate finger or shaft-like member rotatably mounted on a second shaft above, and parallel to, the first shaft. The shaft-like member is generally vertically oriented as a lower end of the shaft-like member pinches the board onto the shoe. The shaft-like member is rotatable in a vertical plane about the second shaft. Advantageously, the shaft-like member is a flexible arm extending radially outwardly of the second shaft. Further advantageously, the board clamp includes a radially spaced array of the flexible arms, radially spaced about the second shaft.

Alternatively, the shaft-like member may be a resiliently telescoping shaft. The resiliently telescoping shaft may in one embodiment be a rotating plunger mounted by an offsetting carrier, linkage, disc or the like (collectively, a carrier) so as to be offset relative to a carrier shaft such as the second shaft. A plunger guide directs the plunger so as to press the free end of the plunger against a board being carried on a board supporting surface of the lug loader, such as a shoe. The offsetting of the plunger causes, firstly, the plunger to be resiliently longitudinally compressed against the board as the second shaft rotates synchronously with rotation of the first shaft to pass the board under the second shaft, and, secondly, the plunger to be lifted free of the board once the board has passed under the second shaft.

In a preferred embodiment, the lug loader of the present invention includes a radially spaced apart array of the shoes, radially spaced around the first shaft.

In one aspect of the present invention, the cam is generally kidney-sha0ed in the orthogonal plane. The cam surface immediately downstream of the cam surface corresponding to the cam lobe merges from a convex sector of the cam surface onto a concave sector of the cam surface. An acute angle is thereby formed between the board supporting surface on the shoe and the rim. As the cam follower on the shoe rides over the cam surface corresponding to the cam lobe when the cam lobe is in the shoe actuating position, the acute angle is reduced so as to translate the board along the transition path in a generally flat orientation.

It is understood that in the lug loader of the present invention the board supporting structure may be a body of rotation, axially symmetric about the first shaft. In a preferred embodiment, the body of rotation is a disc lying generally in a plane orthogonal to the first shaft and the shoe supporting surface is a surface of the disc. Advantageously, a plurality of parallel spaced apart discs are provided, spaced apart along, and orthogonal to, the first shaft. The shoe mounting surface is a surface on each disc of the plurality of discs.

In a further aspect of the present invention, the board retainer and sequencer is a first ducker arm. The first ducker arm is rotatably mounted to a first supporting means and selectively actuably rotatable about the first supporting means between a board retaining position, wherein the board is retained in the holding location, and a board releasing position wherein the board may translate along the transition path on the shoe. The first ducker arm rotates in the downstream direction when rotating from the board retaining position to the board releasing position.

A first ducker timing cam is mounted on the first shaft. A first ducker cam follower is mounted to the first ducker arm for cam following cooperation with the first ducker timing cam. The first ducker timing cam is mounted on the first shaft in a first radial orientation relative to the first shaft so as to lower and elevate the first ducker arm for release of the board synchronously onto the shoe. Advantageously, the first supporting means is a shaft mounted below the infeed transfer and the first ducker arm, in the board releasing position, is reclined in the downstream direction.

Further advantageously, the board retainer and sequencer further includes a second ducker arm selectively rotatably mounted on second supporting means. The second ducker arm is selectively rotatable about the second supporting means independently of the rotation of the first ducker arm about the first supporting means. The second ducker arm is selectively actuably rotatable about the second supporting means between a board retaining position, wherein the board is retained in the holding location, and a board releasing position wherein the board may translate along the transition path on the shoe. The second ducker arm rotates in the downstream direction when rotating from the board retaining position to the board releasing position.

A second ducker timing cam is mounted on the first shaft. A second ducker cam follower is mounted to the second ducker arm for cam following cooperating with the second ducker timing cam. The second ducker timing cam is mounted on the first shaft in a second radial orientation radially spaced from the first radial orientation relative to the first shaft so as to lower and elevate the second ducker arm for release of the board synchronously onto the shoe.

The second supporting means may be a second shaft mounted below the infeed transfer. The second ducker arm in the board releasing position may be reclined in the downstream direction.

In a further aspect, the board supporting structure may be an endless chain rotating around first and second sprockets mounted respectively on said first shaft and on a parallel shaft parallel to and spaced from said first shaft. The chain is advantageously generally level along an upper segment thereof extending between said first and second sprockets. Further advantageously, a fixed track extends parallel to said upper segment of said chain, downstream of said cam and cooperating therewith so that said cam follower passes from said cam downstream onto said track.

The track is oriented to maintain said board supporting surface on said shoe above an outfeed chain.

The invention provides other advantages, which will be made clear in the description of the preferred embodiments.

BRIEF DESCRIPTION OF THE DRAWINGS

The invention will be better understood by reference to the accompanying drawings, wherein:

FIGS. 6a–6d illustrate, in side elevation view, the operation of the staggered disc cams and corresponding duckers according to the lug loader of the present invention in an alternative embodiment;

DETAILED DESCRIPTION OF PREFERRED EMBODIMENT

Figure 1:
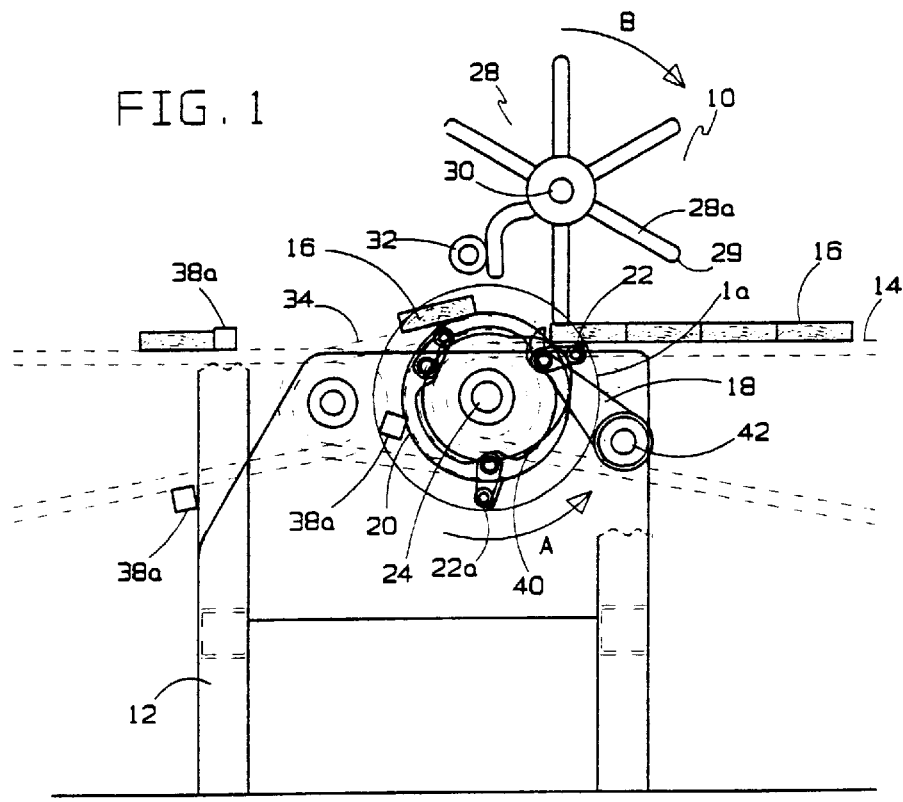
FIGS. 1, 2, 3 and 4 are side elevation views according to the preferred embodiment of the invention showing various stages as the boards are lifted by the shoes and being placed into the lugged transfer in a sequence.
Figure 2:
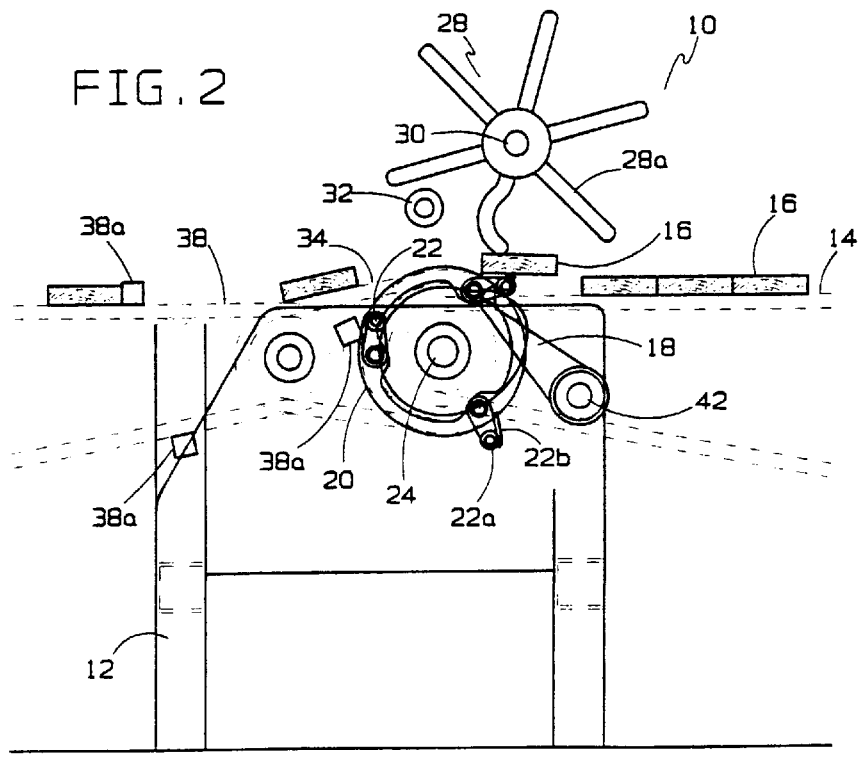

Referring to the drawing figures wherein similar characters of reference represent corresponding parts in each of several views, the lug loader of the present invention is generally indicated by the reference numeral 10.

Figure 1A:
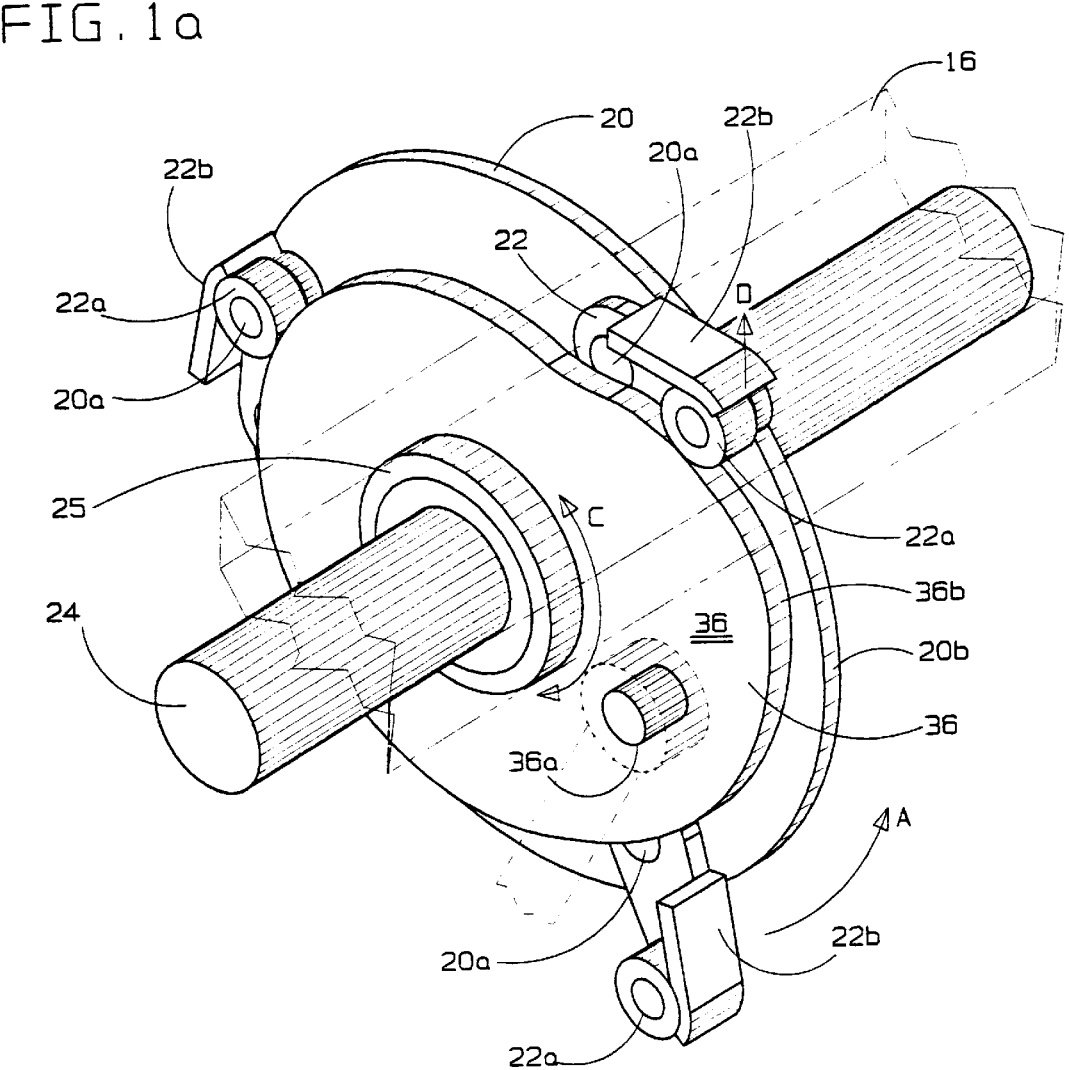
FIG. 1a is, in perspective view, the disc cam and board lifting shoe arrangement of the lug loader of the present invention.
Figure 3:
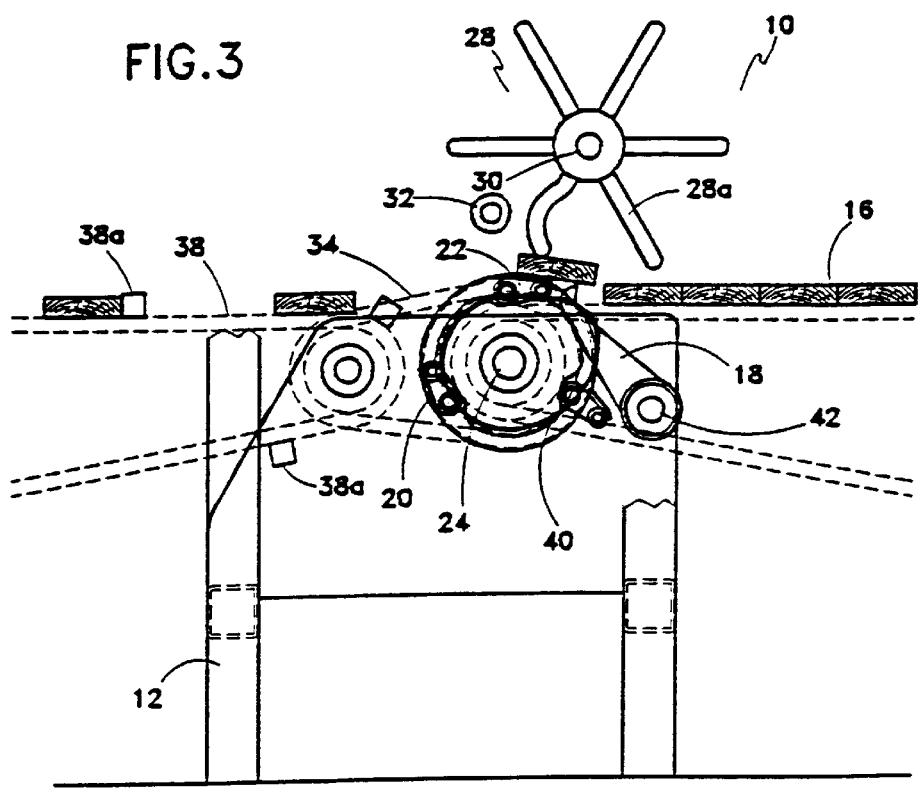
Figure 4:
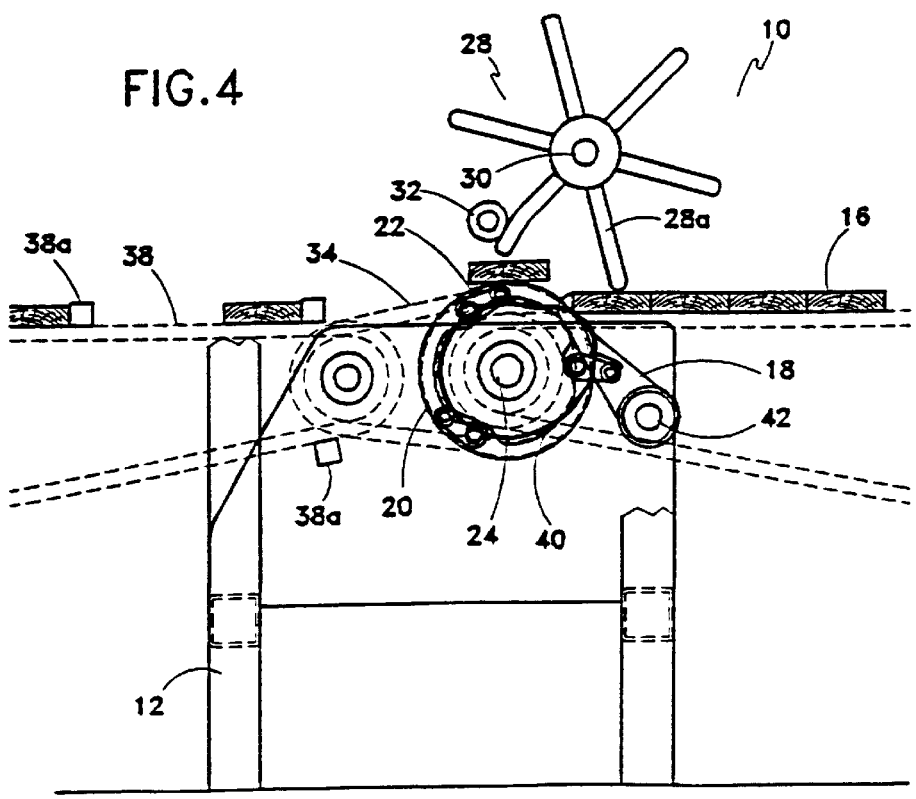

As seen in FIGS. 1–4, lug loader 10 includes a support frame constructed of various vertical and horizontal structural supports 12. An infeed transfer 14 delivers boards 16 to the lug loader 10. A plurality of spaced-apart timed duckers 18, two or more depending on the length of the board, are spaced apart laterally across infeed transfer 14, that is along the length of the board 16. Duckers 18 hold board 16 for selectively timed release from a holding location at the downstream end of a mat of boards 16 formed behind duckers 18. Rotating discs 20 are rigidly mounted to, so as to rotate on, shaft 24 in direction A. Shoes 22 are pivotally mounted to discs 20 in radially spaced apart relation around shaft 24. Cam followers 22a extend outwardly, generally perpendicularly, from shoes 22 as better seen in FIG. 1a. Cam followers 22a position shoes 22 as the cam followers 22a follow cam 36.

Cam 36 is rotatably mounted on shaft 24, for example, by means of hub 25. Cam 36 may be selectively rotated on hub 25 in direction C relative to discs 20, for example, by means of an actuator mounted to pin 36a. Cam 36 has an optimized profile defined by cam surface 36b that cam follower 22a follows in the upper quadrants of cam surface 36b.

Cam followers 22a are held on cam surface 36b by their own weight and the weight of shoes 22 including shoe pad 22b and the elongate arm of the shoes extending between pivot pins 20a on discs 20 and the cam followers. Thus, as shoes 22 are rotated in direction A on discs 20, they hang down freely, suspended by corresponding pins 20a, during their rotation through the lower quadrants of their travel path, and are oriented during their rotation through the upper quadrants of their travel path by cam followers 22a sliding or rolling over cam surface 36b.

Cam lobe 36c is asymmetrically bulbous in a plane orthogonal to shaft 24. The orientation of cam 36 about shaft 24 on hub 25 dictates whether cam lobe 36c is elevated or lowered between, respectively, a shoe actuating position (seen in FIGS. 1, 1a, 2–4) and a shoe non-actuating position (seen in FIG. 5). In the shoe actuating position, cam lobe 36c is elevated so that cam follower 22a riding on cam surface 36b over cam lobe 36c drives shoe pad 22b radially outwardly beyond the radially outer-most edge 20b of discs 20. The shoe actuating position of cam lobe 36c coincides with the radial position, relative to shaft 24, of a board 16 (shown in dotted outline in FIG. 1a) held by duckers 18 in their holding location adjacent the upstream side of discs 20. Thus, with cam lobe 36c in its shoe actuating position, as discs 20 rotate in direction A so to are rotated shoes 22, driving shoe pads 22b in direction D into engagement with the underside of the board 16 in the holding location.

In the shoe non-actuating position, cam lobe 36c is rotated so as to be lowered, so that shoe pad 22b on shoe 22 is not driven in direction D but, rather, remains below, i.e. radially beneath, edges 20b of discs 20. Board 16 is thereby not engaged, but left in the holding location.

In operation cam 36 may be rotated down into its shoe non-actuating position so that shoe pad 22b will miss board 16 in a high speed disengage mode. Board 16 is held by duckers 18.

As shoe 22 is rotated by rotation of disc 20, shoe pad 22b travels at an optimized angle, so that board 16 remains in contact with shoe pad 22b as much as possible while board 16 is lifted and transferred over disc 20 by shoe 22.

Clamping means such as overhead pincher 28, has in one preferred embodiment, although not intended to be limiting, mounted thereto, so as to protrude radially therefrom, a plurality of resilient members such as flexible arms 28a. Pincher 28 rotates on shaft 30 in direction B. Fixed roller 32 may be provided so that flexible arms 28a contact roller 32 when the flexible arm in contact with the a board 16 is no longer required to press board 16 down onto shoe 22. Fixed roller 32 thereby transfers control of board 16 to outfeed transition chain 34. Roller 32 disengages flexible arm 28a from board 16 by deforming or flexing flexible arm 28a against roller 32 as pincher 28 rotates in direction B. Transition chain 34 may be running at the same rotational speed as discs 20, or it may be running at a higher speed so as to advance the board 16 for delivery.

The ends 29 of flexible arms 28a and shoes 22 converge as they counter-rotate to clamp or pinch, and subsequently lift, board 16 as overhead pincher 28 rotates on shaft 30 and shoes 22 rotate in their arcuate travel path on discs 20.

Figure 5:
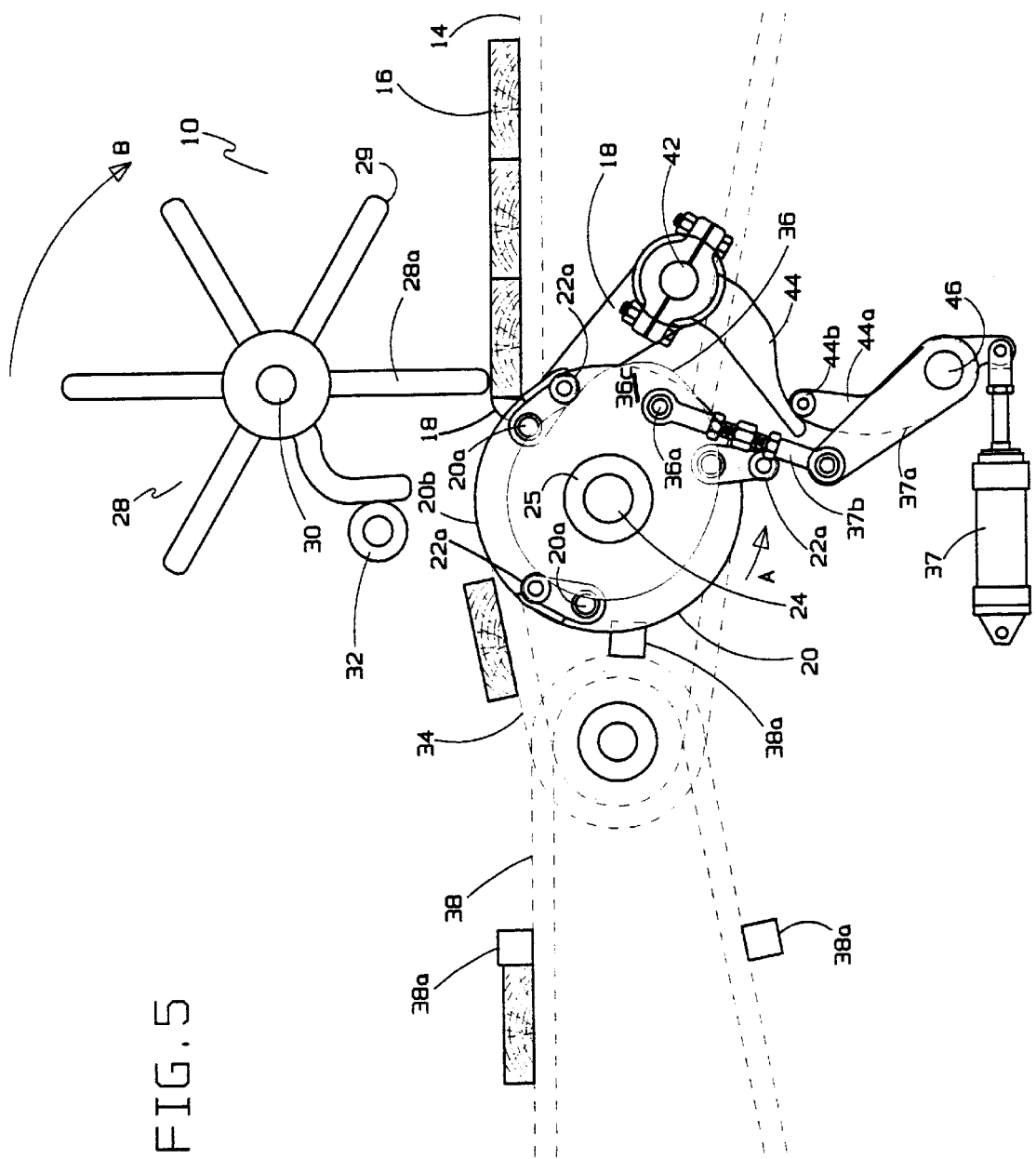
FIG. 5 is a side elevation view according to the preferred embodiment of the invention showing cam 36 rotated down to disengaging shoes 22.

As better seen in FIG. 5, cam lobe 36c is selectively rotated between its lowered shoe non-actuating position and its elevated shoe actuating position by the selective actuation of cylinder 37. Extension of the cylinder rod from cylinder 37 rotates linkage member 37a in a direction counter-clockwise as viewed in FIG. 5 so as to tension turnbuckle 37b. Turnbuckle 37b is pivotally mounted at its ends, the lowermost end of turnbuckle 37b pivotally mounted to the uppermost end of linkage member 37a, and the uppermost end of turnbuckle 37b pivotally mounted to pin 36a on cam lobe 36c. Linkage member 37a is itself pivotally mounted on shaft 46.

Also commonly rigidly mounted on shaft 46 is linkage actuating arm 44a. Roller 44b is mounted on the uppermost end of linkage actuating arm 44a so as to contact a lower surface on the lowermost end of linkage member 44. Linkage member 44 is pivotally mounted at its upper end on shaft 42. Commonly rigidly mounted on shaft 42 is a ducker 18 or, in the preferred embodiment, a spaced apart array of duckers 18 all mounted in the same radial relationship about shaft 42 relative to linkage member 44 so that rotation of linkage member 44 about shaft 42 actuates ducker 18 or simultaneously actuates the array of duckers. Extending the rod from cylinder 37, rotates linkage actuating arm 44a counter-clockwise as viewed in FIG. 5 so as to rotate linkage member 44 and ducker 18 clockwise thereby engaging stop 18b on the upper end of ducker 18 against the downstream most edge of the downstream most board 16 in the mat of boards held on infeed transfer 14.

Thus, actuating cylinder 37 so as to extend the rod from the cylinder simultaneously rotates cam lobe 36c into its shoe non-actuating position and raises ducker 18 or the array of duckers so as to interrupt the downstream flow of boards 16. This allows the deliberate skipping, that is, the allowing of lug spaces between lugs 38a on lug chain 38 to go by while the singulator is effective disabled although the rotating disc and shoes remain rotating. To re-enable the singulator, cylinder 37 is actuated so as to retract its rod thereby simultaneously elevating cam lobe 36c into the shoe actuating position and releasing ducker 18 or the array of duckers so that the actuation of ducker 18 or the array of duckers is governed by a ducker cam 40 as better described below.

Figure 5A:
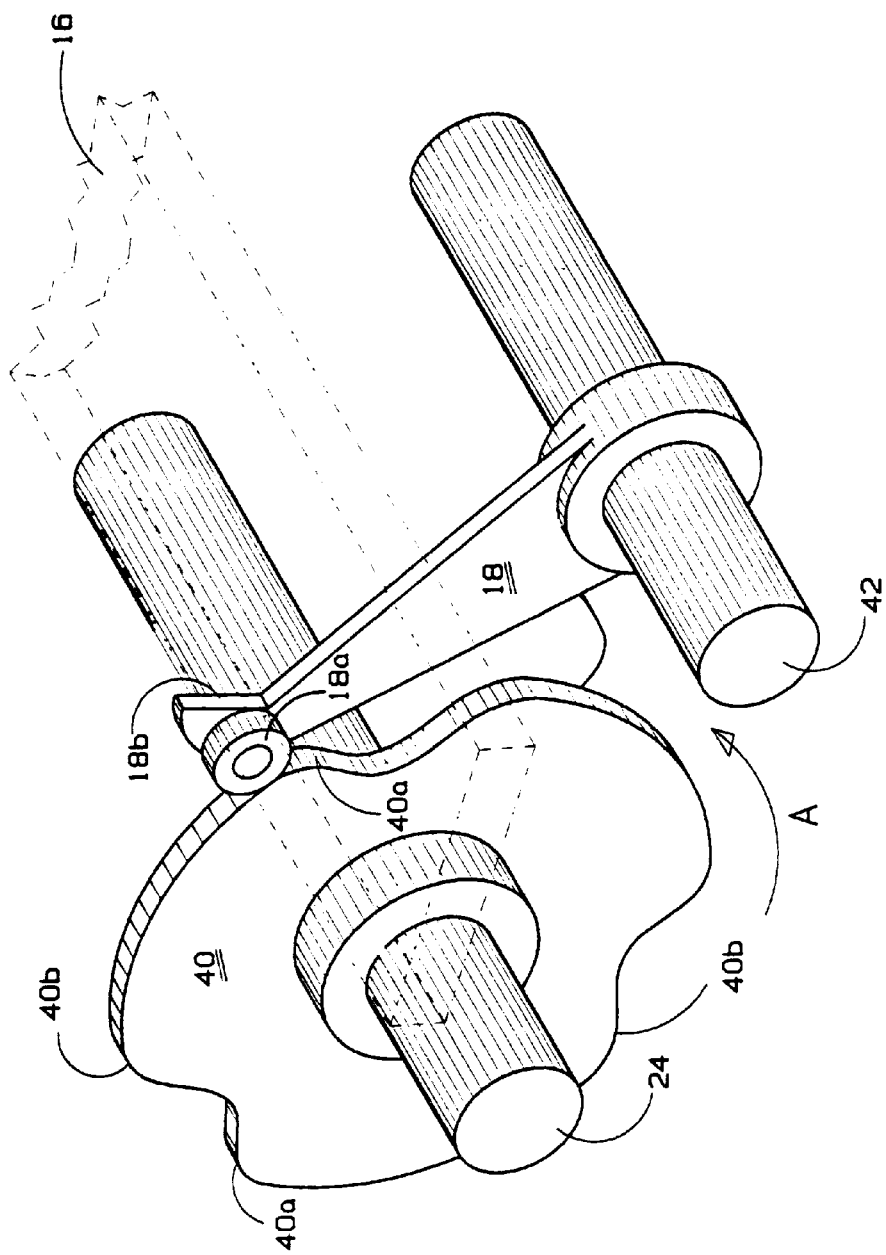
FIG. 5a is, in perspective view, the disk cam and ducker arrangement of the lug loader of the present invention in an alternative embodiment.
Figure 6:
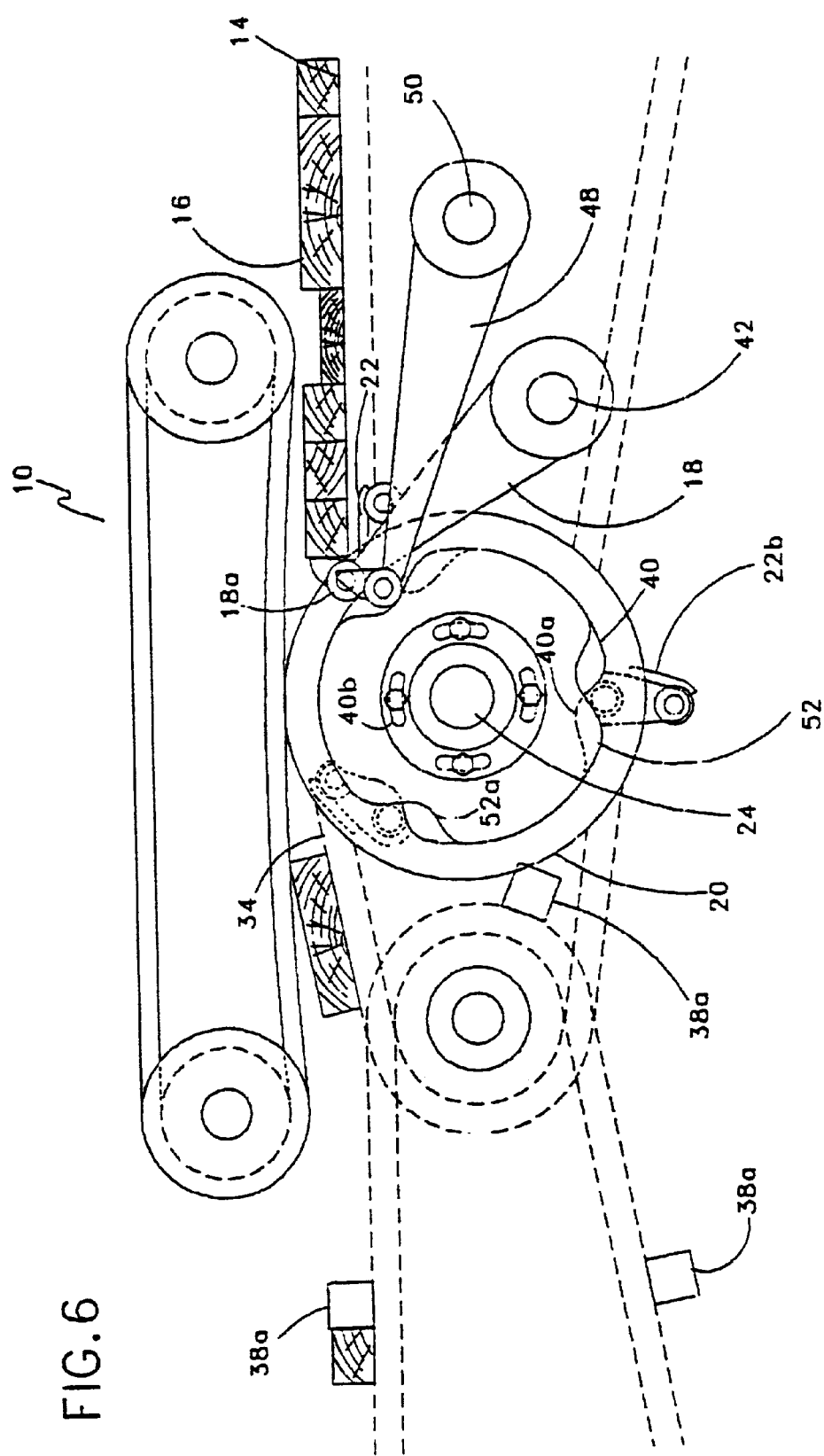
FIGS. 6, 7 and 8 are side elevation views according to an alternate embodiment of the invention showing the optional dual ducker system for faster mechanical ducker timing controlling the flow of narrow boards. The secondary ducker 48 is shown up front of the primary ducker 18.
Figure 6C:
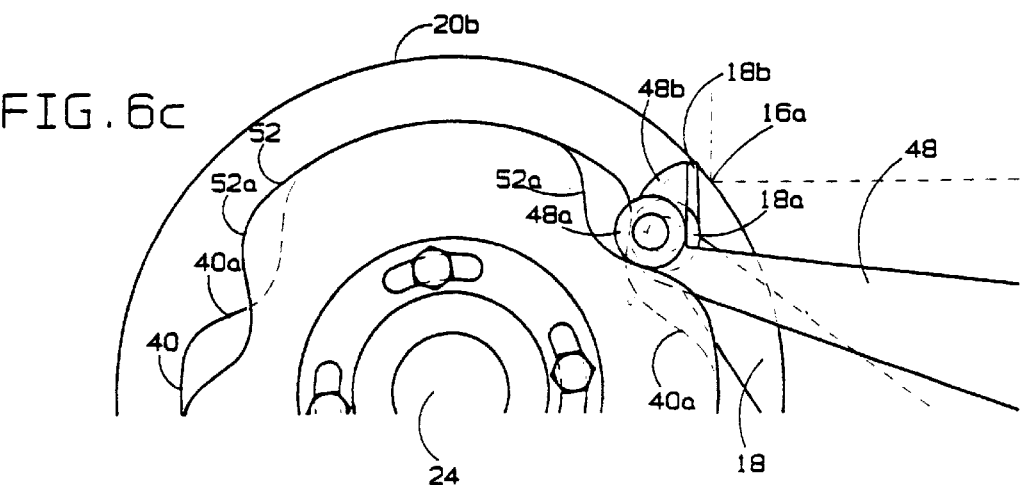
Figure 6D:
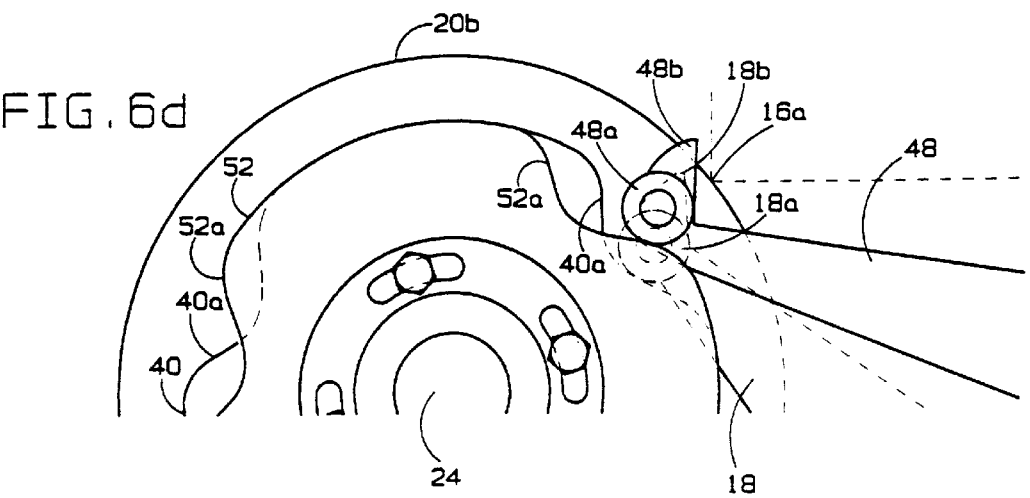
Figure 6E:
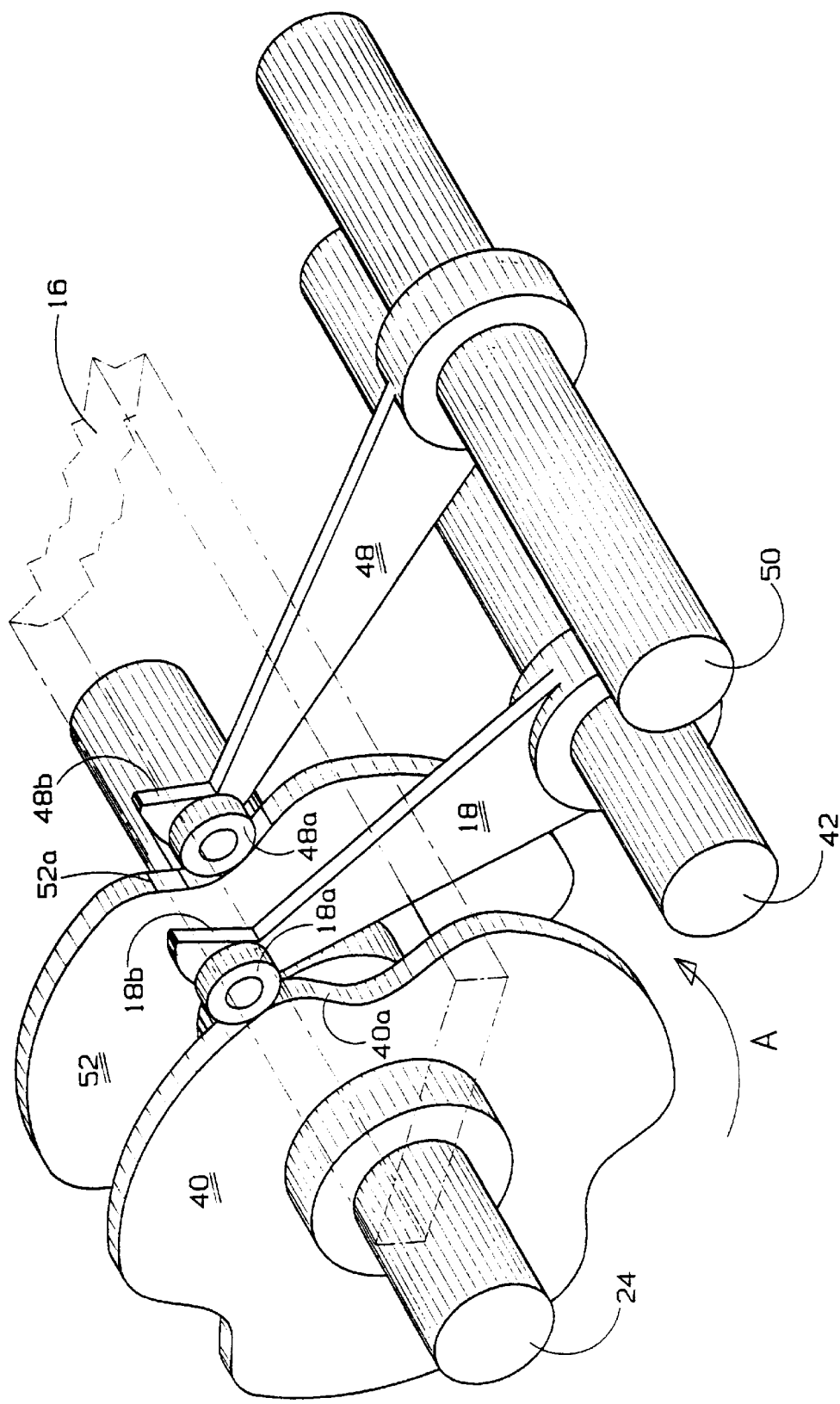
FIG. 6e is a perspective view of the staggered disc cams and duckers of FIGS. 6a–6d.

As seen in FIG. 5a when ducker 18 is not locked in its elevated position by the operation of cylinder 37, ducker followers 18a are free to ride on cam surface 40a as ducker cam 40 rotates on common shaft 24. Thus, with cam lobe 36c rotated into the elevated shoe actuating position, ducker follower 18a is free to ride on ducker cam surface 40a. Ducker cam lobes 40b are radially spaced apart about shaft 24 on cam 40 and are also radially spaced about shaft 24 relative to shoes 22 on rotating disc 20. Disc 20 is mounted laterally spaced from cam 40 on shaft 24. Cam lobes 40b are radially spaced relative to shoes 22 so that as shoes 22 rotate around lobe 36c so as to engage the underside of the downstream most board 16 held by stop 18b on ducker 18, ducker 18 is lowered. Ducker 18 is lowered as ducker follower 18a follows into the depression ahead of cam lobe 40b. Ducker 18 is thus lowered as board 16 is lifted by shoe 22. As board 16 is lifted and rotated in a downstream direction on shoes 22, cam lobe 40b then engages ducker follower 18a so as to raise ducker 18 and stop 18b to arrest the downward movement of adjacent board 16 in the board mat on infeed transfer 14.

Ducker follower 18a follows on cam surface 40a under the force of gravity, ducker 18 being free to rotate about shaft 42. It will be appreciated that at higher feed speeds required of the singulator to place boards into the spaces between lugs 38a, for example, when the outfeed transfer chain and lugged chain are rotating at higher speeds, it is necessary to actuate duckers 18 between their lowered board releasing position and their elevated board flow stopping position in a short period of time so as to assist in singulating the boards onto the shoes and thence onto the outfeed transition chain. Unfortunately, at higher feed speeds, the curvature of cam surface 40a becomes an increasingly radical curvature to the point where ducker follower 18a will jump from cam surface 40a due to the radical curvature and rapid rate of change of curvature due to the increased rotational speed of cam 40. This results in loss of accuracy of the timing of the lowering and elevating of ducker 18.

Consequently, in one preferred embodiment, a dual ducker system is employed where a first ducker 18 or array of duckers 18 is actuated spaced apart in time from actuation of a second ducker 48' or array of laterally spaced apart secondary duckers 48' as better understood with reference to FIGS. 6, 6a–6e. Unless disabled by mechanisms similar to that described above in respect of the linkage attached to cylinder 37 as seen in FIG. 5, duckers 18 and secondary duckers 48' follow the cam surface curvature of their corresponding ducker cams 40 and 40'. Duckers 18' and corresponding cam or cams 40' are generally identical to, and operate in the same way as duckers 18 and cams 40. That is, cam followers 48 follow the curvature of cam surface 52a in a similar fashion to the interaction between cam followers 18a on cam surfaces 40a. The shape of cam surface 52a is similar to that of cam surface 40a.

In the embodiment as illustrated, the second duckers 48, which are pivotally mounted on shaft 50, actuate in time slightly ahead of actuation of duckers 18. This is accomplished by radially spacing apart about shaft 24 the actuating cam curvature of cam surfaces 40a and 52a relative to each other so that, in the embodiment illustrated, as the cams rotate in direction a in unison with rotating disc 20, the smoothly curved indentation in cam surface 40a leads the corresponding smooth indentation on cam surface 52a so that ducker or duckers 18 are lowered before secondary ducker or duckers 48 are lowered and subsequently ducker or duckers 18 are elevated before secondary ducker or duckers 48. Typically the radial spacing of the corresponding actuating curvature of cam surfaces 40a and 52a will fall within the range of 3–10 degrees. This approximately corresponds to spacing apart in time of the actuation of duckers 18 and secondary duckers 48 within the approximate range of 20–70 milliseconds given a typical rotational speed of shaft 24 in the order of 0.4 revolutions per second (approximately 25 RPM).

As may be seen, in the illustrated preferred embodiment, cams 40 and 52 each have 3 actuating curvatures equally radially spaced apart around corresponding cam surfaces 40a and 52a relative to shaft 24.

Thus as seen in sequence illustrated in FIGS. 6a–6d, as shaft 24 rotates discs 20 and cams 40 and 52 in direction A, as a shoe 22 is being rotated into position to pick up a board 16 (where in FIGS. 6a–6d the shoes are not illustrated for sake of clarity) it is required to lower both duckers 18 and secondary duckers 48. This is done in sequence first by lowering, for example, secondary duckers 48 as illustrated which is then sequentially followed in time by lowering of duckers 18. Once the board has been picked up by shoes 22, the duckers have to be elevated. Once again in the example illustrated the secondary duckers lead and are elevated before elevation of duckers 18. In this fashion each set of duckers whether it is duckers 18 or duckers 48, are given time to follow a more smoothly curved and less radical curvature on their corresponding cam surfaces the end effect being that of a very fast actuation of a single ducker or array of duckers 18.

Duckers 18, as controlled by ducker cam 40, are timed to release a board 16 onto shoes 22 on discs 20 as shoes 22 are rotated into position.

Advancing lugs 38a are timed with shoes 22 on rotating discs 20. The overhead pincher means 28 and shoe 22 begin to retract back away from the board 16 at about top center of disc 20 where the board 16 now contacts the disc 20 and the overhead pincher means 28.

Figure 7:
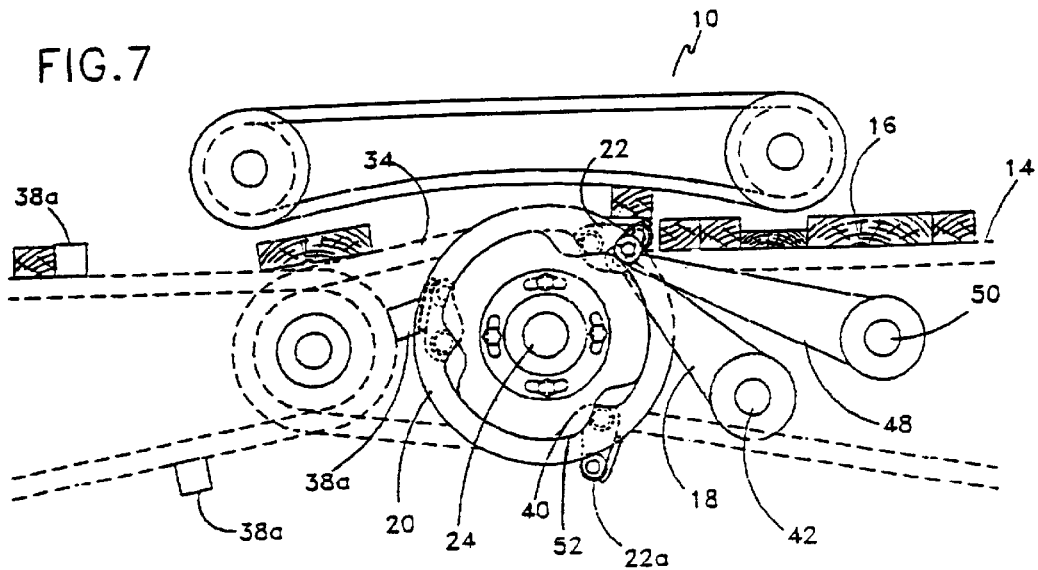
Figure 8:
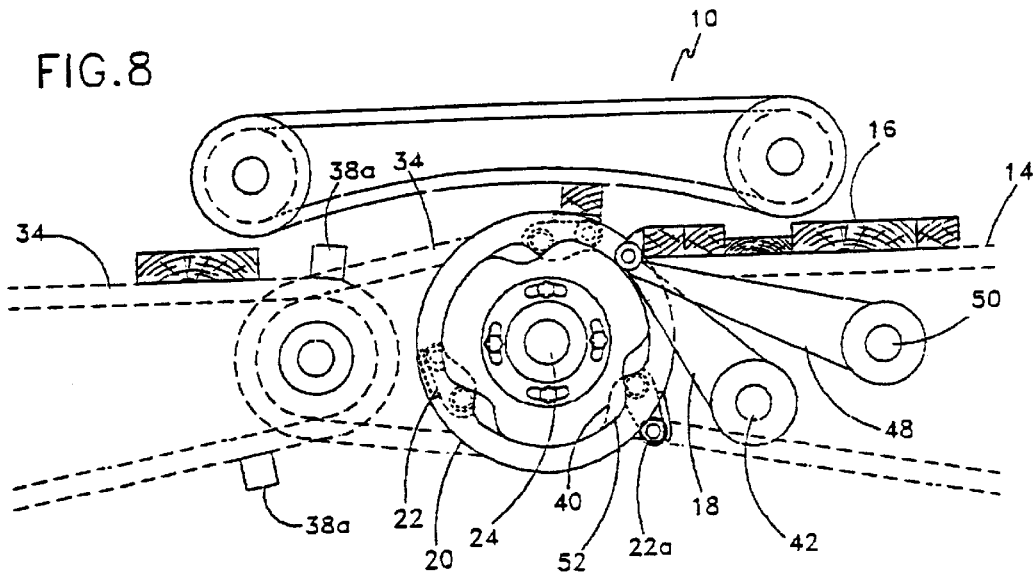

Thus, the dual ducker system seen also in FIGS. 7 and 8 allows for increased speed of the cam actuated duckers without the need for using radical ducker cam profiles in order to increase the up and down motion of the duckers, this allows for the handling of very narrow boards alone or mixed in with wider boards.

Alternative overhead pinching means include any resilient device for resiliently holding a board 16 onto shoes 22, and in particular may include belts (see FIGS. 7, 8 and 13–15) telescoping plungers (see FIGS. 9–11) and the flexible arms of FIGS. 1–6, 12 and 12a.

Figure 9:
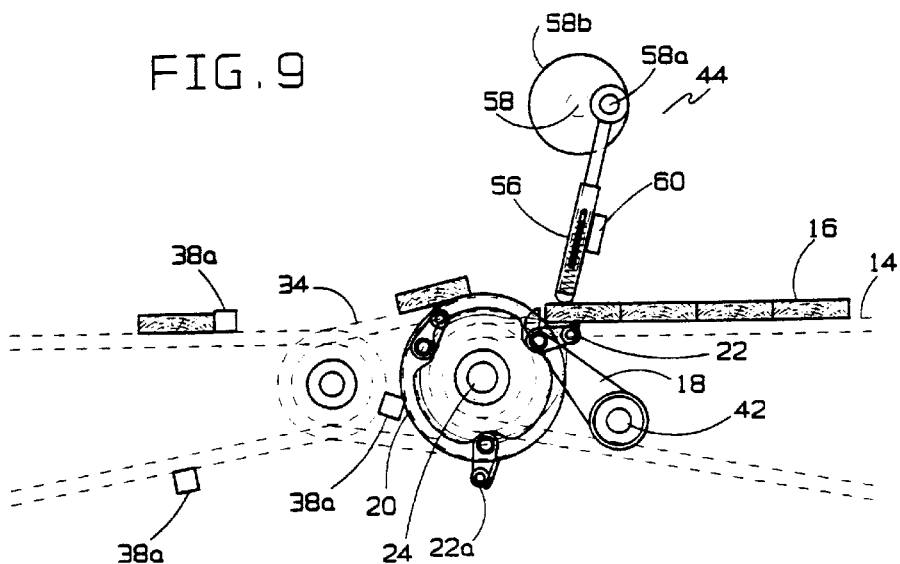
FIGS. 9, 10 and 11 are side elevation views according to an alternate overhead pincher means.
Figure 10:
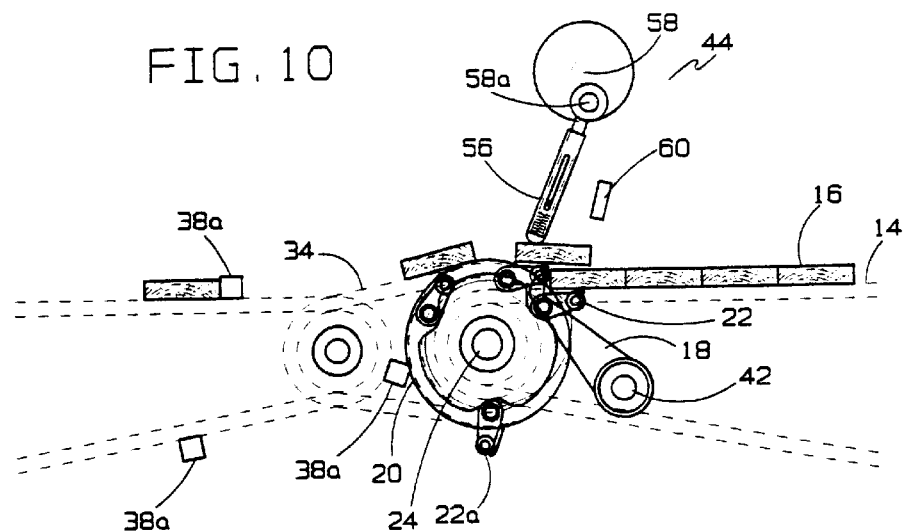
Figure 11:
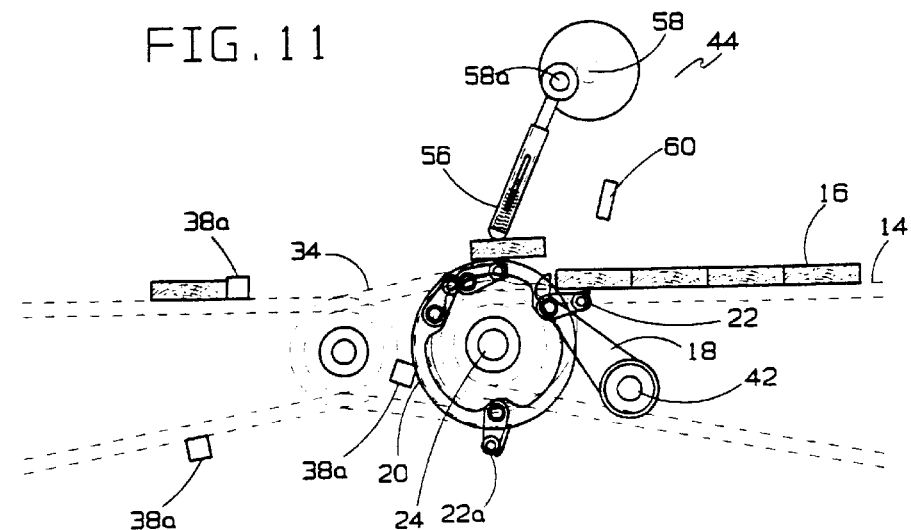

Thus as seen in FIGS. 9–11, rotating plunger 56 is mounted offset relative to shaft 58 by means of an offset shaft boss pin 58a on rotating disc 58b. Plunger 56 follows fixed guide 60, down onto board 16 to clamp board 16 onto shoes 22. Rotating plunger 56 includes a resilient means such as spring 56a. Contact nose 56b on plunger 56 contacts board 16 and remains in contact with board 16 while board 16 is lifted up by shoe 22 and translated over disc 20. Once board 16 has translated over the top of disc 20, plunger 56 is lifted from contact with board 16 by rotating pin 58a on disc 58b. Plunger 56 is then positioned for the next board 16 to be clamped.

Figure 13:
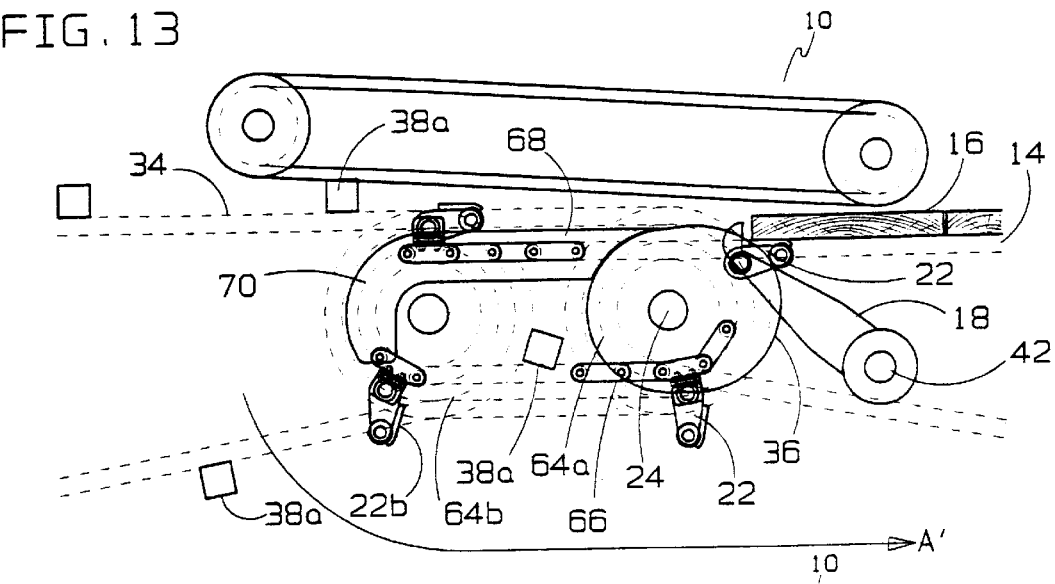
FIGS. 13, 14, and 15 are side elevation views of another alternate embodiment showing chains carrying the shoes.
Figure 14:
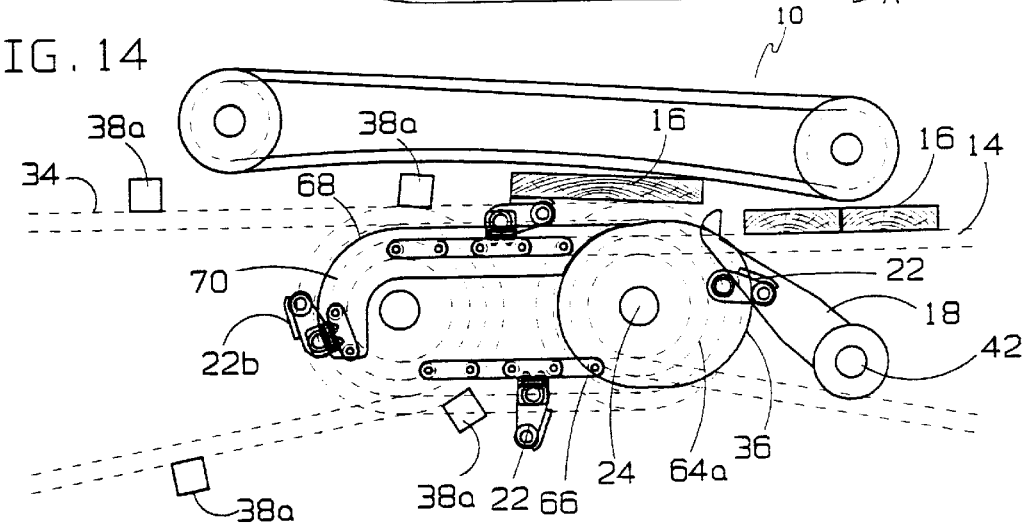
Figure 15:
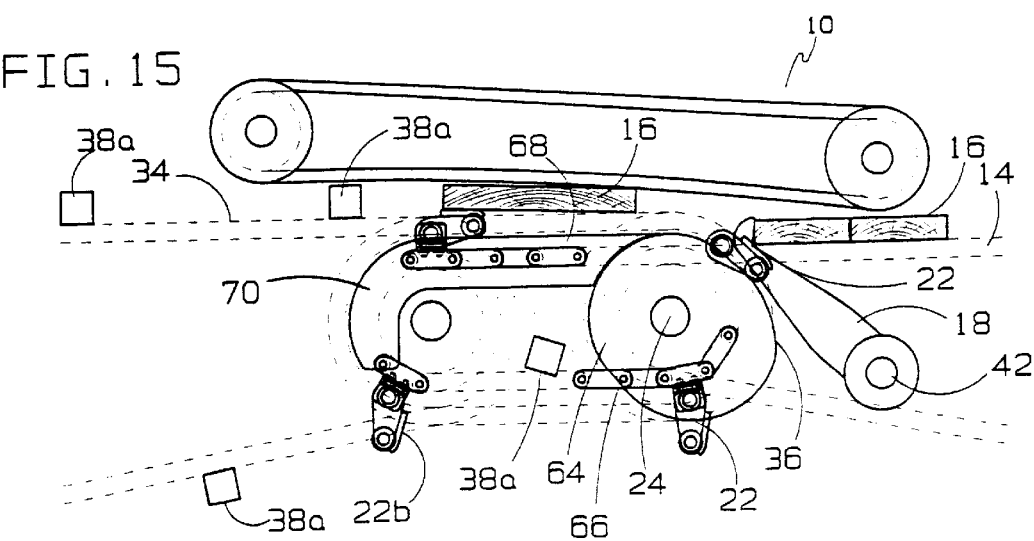

As seen in FIGS. 13–15, in a further alternative embodiment disc 20 is replaced with sprockets 64a, 64b and chains 66. Chains 66 rotate around sprockets 64a and 64b in direction A. Shoes 22 are rotatably mounted to chains 66. Shoe followers 22a follow cam 36 until reaching the top center of sprocket 64a, where from shoe followers 22a follow along tracks 68. Shoes 22 turn around sprockets 70, and continue to follow tracks 68. Below tracks 68 shoes 22 pivot to hang down until they round sprocket 64a on chain 66 to engage the next board 16. This embodiment allows shoes 22 to carry boards 16 right into the lug spaces with very little elevation change. It also avoids the crown at the top of discs 20, which may assist in singulating wider boards which might otherwise hang up on the upstream surfaces of discs 20 because the clamping between the overhead claps and the shoes releases before the board center of mass passes downstream of the top of discs 20.

Figure 12:
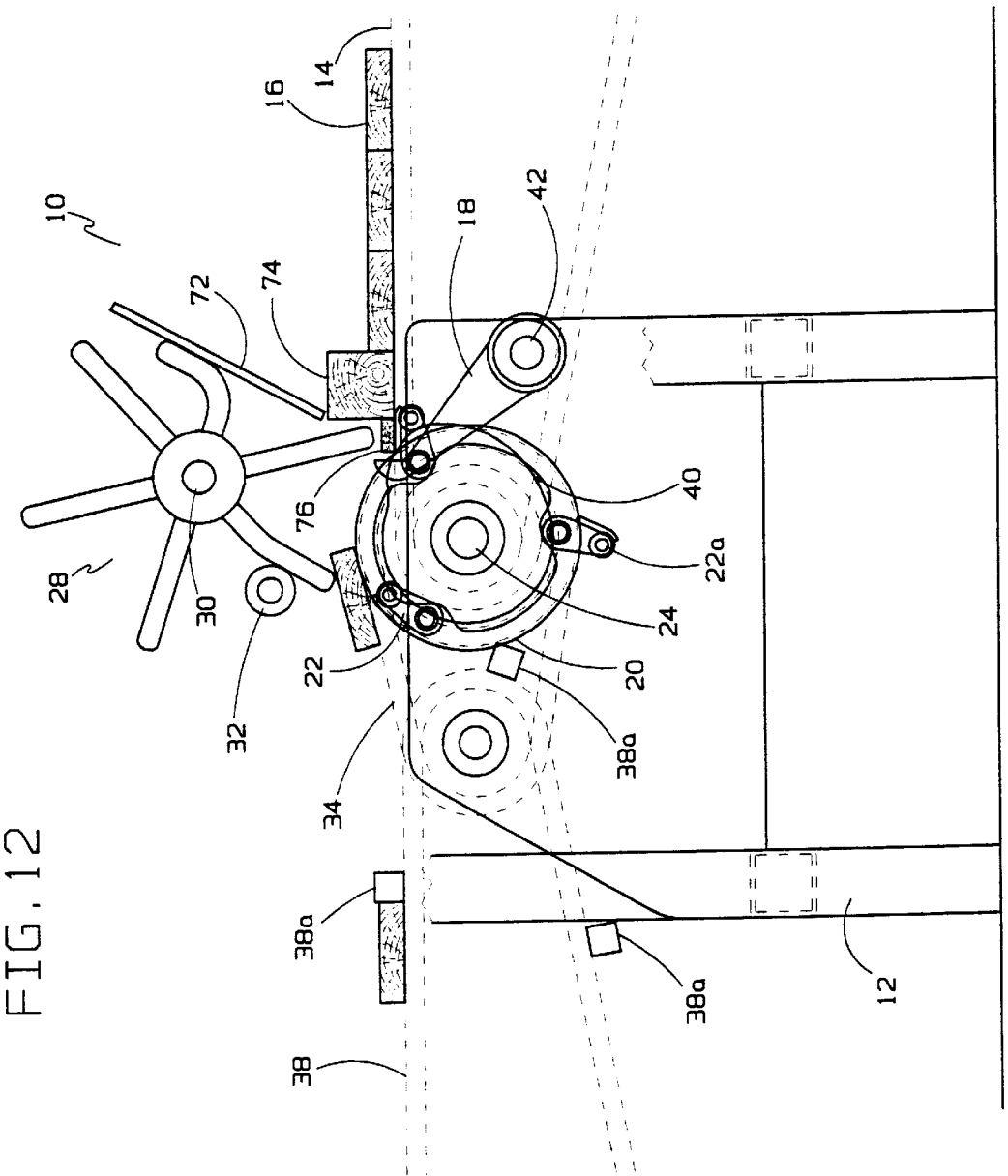
FIG. 12 is a side elevation view according to the preferred embodiment showing an optional roller and guide for the overhead pincher means.
Figure 12A:
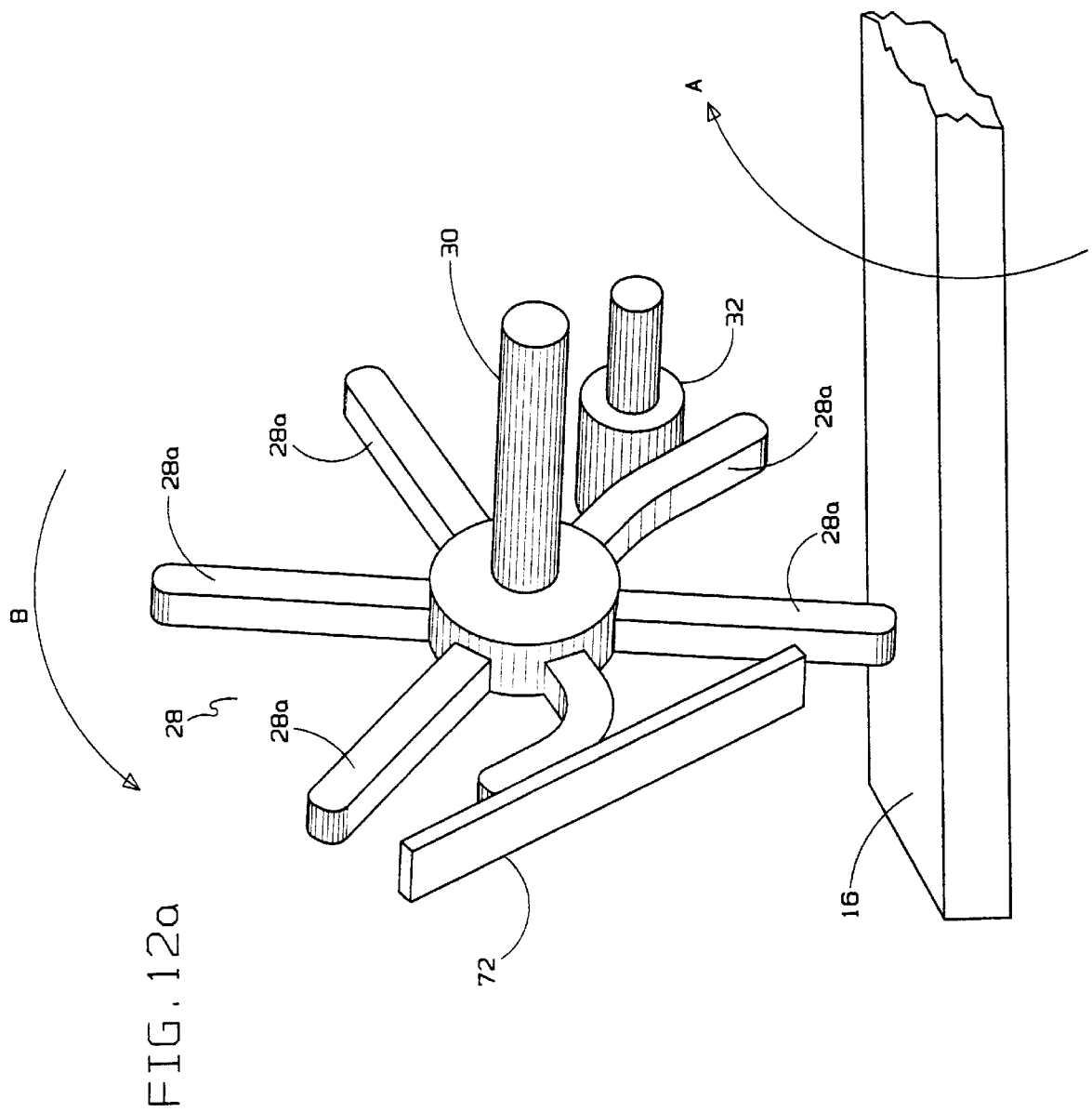
FIG. 12a is, in partially cut-away perspective view, a board hold down device according to one embodiment of the present invention.

As seen in FIGS. 12 and 12a, the preferred embodiment may include an inclined guide 72 which allows flexible arms 28a to clear over a 4 inch by 4 inch board 74 yet be able to spring down onto a 2 inch by 2 inch board 76, when handling mixed variable thickness in cross section boards in the board mat in order to hold down all boards, no matter of what thickness within allowable parameters known in the art onto the shoes 22. Guide 72 may cause flexible arms 28a to flex off to one side to improve board contact as the arms release from the guide.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A lug loader comprising:
   a first shaft rotatably mounted transversely across a board flow path, wherein a board in said board flow path is aligned transversely across said board flow path and translates in a downstream direction on a board infeed transfer from an upstream position,
   a board supporting structure mounted to said first shaft so as to rotate with rotation of said first shaft, said board supporting structure having a shoe mounting surface generally orthogonal to said first shaft and having a radially outer-most rim, radially outer-most relative to said first shaft, said rim generally circumferentially contiguous so as to form a board supporting surface around said rim,
   an elongate shoe having first and second ends, a board supporting heel mounted thereon, said shoe pivotally mounted at said first end of said shoe to said shoe mounting surface, a cam follower mounted to said shoe so as to protrude from said shoe away from said shoe mounting surface,
   a selectively rotatable cam mounted on a cam support, said cam cooperating with said cam follower, said cam independently selectively rotatable relative to said first shaft, said cam having a cam surface lying generally in a first plane adjacent to and generally parallel with said shoe mounting surface, said cam surface a radial cam distance from said cam support, said rim a radial rim distance from said cam support, said radial cam distance less than said radial rim distance, said cam surface defining a first cam lobe, said first cam lobe asymmetric and radially extended about said cam support relative to a non-extended circumference of said cam surface, said first cam lobe generally on an upstream side of said cam, said non-extended circumference of said cam generally on a downstream side of said cam, said cam lobe selectively rotatable, by selective rotation of said cam by a cam actuator, between an upwardly rotated shoe actuating position and a downwardly rotated shoe non-actuating position, said cam follower lying generally in said first plane and cooperating with said cam surface so as to ride over, in surface following contact with, said cam surface on said upstream and downstream sides of said cam, as said board supporting structure rotates about said first shaft relative to said cam, said cam lobe when in said shoe actuating position driving said board supporting surface on said shoe radially outwardly of said rim as said cam follower rides over said cam surface corresponding to said cam lobe.

2. The lug loader of claim 1 further comprising a selectively actuable board retainer and sequencer at a board holding location in said board flow path, adjacently upstream of said board supporting structure, wherein said board when retained in said board retainer is held in said holding location for sequenced release onto said board supporting surface of said shoe as said shoe is rotated over said cam lobe when said cam lobe is in said shoe actuating position, whereby said board is translated along a transfer path over said board supporting structure onto a board outfeed transfer so as to singulate said board from an upstream mat of boards upstream of said board retainer.

3. The lug loader of claim 1 wherein said board supporting structure is a plurality of parallel spaced apart discs, spaced apart along, and orthogonal to, said first shaft, and said shoe mounting surface is a surface on each disc of said plurality of discs.

4. The lug loader of claim 1 wherein said cam is rotatably mounted on said first shaft.

5. The lug loader of claim 1 wherein said board supporting structure is an endless chain rotating around first and second sprockets mounted respectively on said first shaft and on a parallel shaft parallel to sand spaced from said first shaft, wherein said chain is generally level along an upper segment thereof extending between said first and second sprockets.

6. The lug loader of claim 5 wherein a fixed track extends parallel to said upper segment of said chain, downstream of said cam and cooperating therewith so that said cam follower passes from said cam downstream onto said track, said track oriented to maintain said board supporting surface on said shoe above an outfeed chain.

7. The lug loader of claim 1 wherein said cam surface immediately downstream of said cam surface corresponding to said cam lobe merges from a convex sector of said cam surface into a concave sector of said cam surface whereby an acute angle, formed between said board supporting surface on said shoe and said rim as said cam follower on said shoe rides over said cam surface corresponding to said cam lobe when said cam lobe is in said shoe actuating position, is reduced so as to translate said board along an optimized transition path at an optimized attitude relative to the horizontal.

8. The lug loader of claim 7 wherein said optimized attitude is generally horizontal.

9. The lug loader of claim 1 wherein said board supporting structure is a body of rotation, axially symmetric about said first shaft.

10. The lug loader of claim 9 wherein said body of rotation is a disc lying generally in a plane orthogonal to said first shaft and said shoe supporting surface is a surface of said disc.

11. The lug loader of claim 1 wherein said board retainer and sequencer is a first ducker arm, said first ducker arm rotatably mounted to a first supporting means and selectively actuably rotatable about said first supporting means between a board retaining position, wherein said board is retained in said holding location, and a board releasing position wherein said board may translate along said transition path on said shoe, wherein said first ducker arm rotates down when rotating from said board retaining position to said board releasing position, a first ducker timing cam mounted on said cam support, a first ducker cam follower cooperating with said first ducker arm for cam following cooperation with said first ducker timing cam, said first ducker timing cam mounted on said cam support in a first radial orientation relative to said cam support so as to lower and elevate said first ducker arm for release of said board synchronously onto said shoe.

12. The lug loader of claim 11 wherein said first supporting means is a shaft mounted below said infeed transfer and wherein said first ducker arm, in said board releasing position, is reclined in said downstream direction, and wherein said cam support is said first shaft.

13. The lug loader of claim 11 wherein said board retainer and sequencer further comprises a second ducker arm selectively rotatably mounted on second supporting means, selectively rotatable about said second supporting means independently of said rotation of said first ducker arm about said first supporting means, said second ducker arm selectively actuably rotatable about said second supporting means between a board retaining position, wherein said board is retained in said holding location, and a board releasing position wherein said board may translate along said transition path on said shoe, wherein said second ducker arm rotates down when rotating from said board retaining position to said board releasing position, a second ducker timing cam mounted on said cam support, a second ducker cam follower cooperating with said second ducker arm for cam following cooperating with said second ducker timing cam, said second ducker timing cam mounted on said cam support in a second radial orientation radially spaced from said first radial orientation relative to said cam support so as to lower said second ducker arm for release of said board synchronously onto said shoe and elevate said second ducker arm for capture of an adjacent board.

14. The lug loader of claim 13 wherein said second supporting means is a second shaft mounted below said infeed transfer and wherein said second ducker arm in said board releasing position is reclined in said downstream direction, and wherein said cam support is said first shaft.

15. The lug loader of claim 1, further comprising a rotatable resilient board clamp rotatably mounted over said board supporting structure cooperating with said shoe so as to pinch said board between said resilient clamp and said board supporting surface on said shoe as said board is translated along said transfer path.

16. The lug loader of claim 15 further comprising a radially spaced apart array of said shoes, radially spaced around said first shaft.

17. The lug loader of claim 15 wherein said resilient clamp is a resilient elongate shaft-like member rotatably mounted on a second shaft above, and parallel to, said first shaft, said shaft-like member generally vertically oriented as a lower end of said shaft-like member pinches said board onto said shoe, said shaft-like member rotatable in a vertical plane about said second shaft.

18. The lug loader of claim 17 wherein said shaft-like member is a flexible arm extending radially outwardly of said second shaft.

19. The lug loader of claim 18 wherein said board clamp comprises a radially spaced array of said flexible arms, radially spaced about said second shaft.

20. The lug loader of claim 15 wherein said shaft-like member is a resiliently telescoping shaft.

21. The lug loader of claim 20 wherein said telescoping shaft is a plunger mounted at one end thereof to a rotatable carrier, said carrier rigidly mounted to a rotatable carrier shaft, said plunger mounted on said carrier offset relative to said carrier shaft.

22. The lug loader of claim 21 further comprising a plunger guide for directing said plunger so as to press a free end of said plunger against a board on said shoe for resilient longitudinal compression of said plunger against said board as said shaft is rotated synchronously with translation of said board along said transfer path, and for synchronously lifting said free end of said plunger from said board as said board passes along said transfer path from said lug loader, said plunger rotating in a vertical plane parallel to and intersecting said transfer path.

\* \* \* \* \*